March 9, 1948.  B. ZIMMERN  2,437,585
CHILD'S SWIVEL HARNESS
Filed July 24, 1946  2 Sheets-Sheet 1
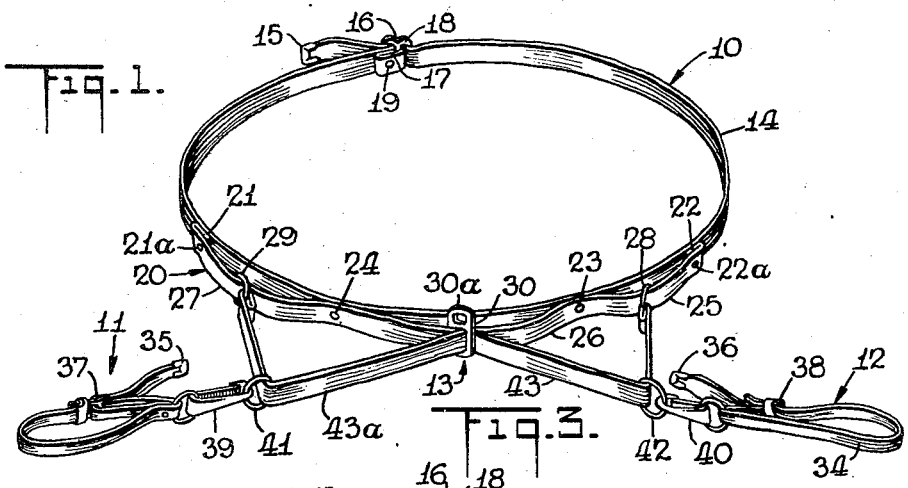
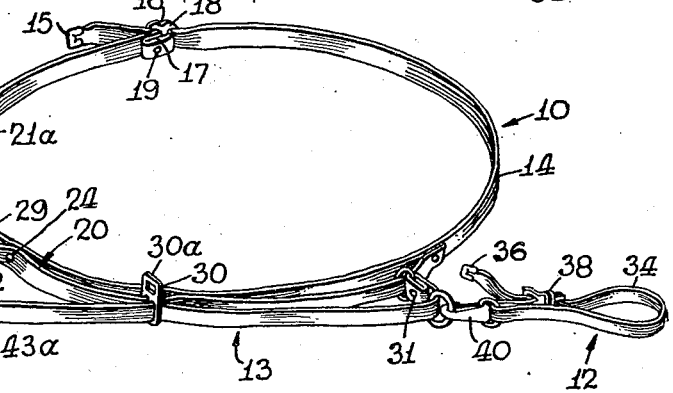
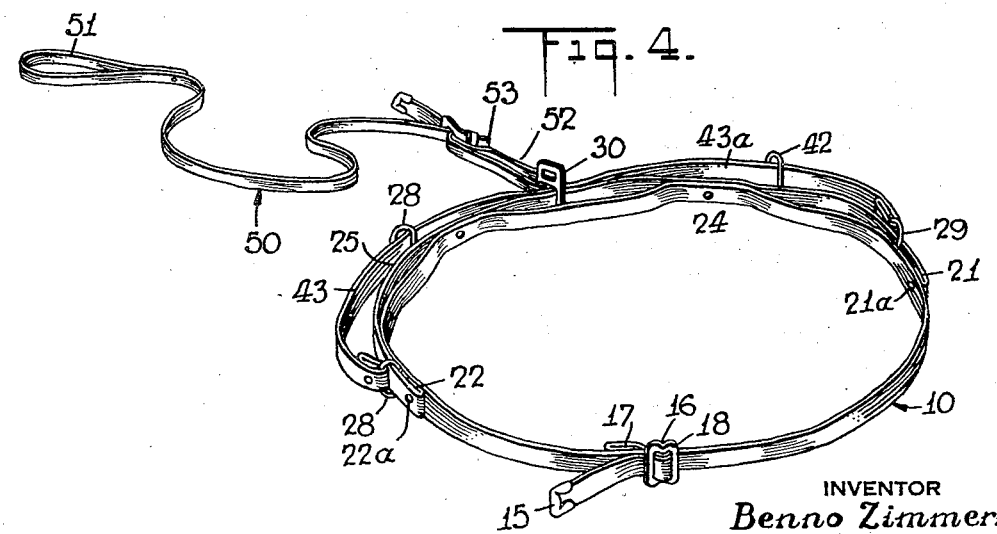
INVENTOR
Benno Zimmern.
BY Harry Ernest Rubens
ATTORNEY March 9, 1948. B. ZIMMERN 2,437,585
CHILD'S SWIVEL HARNESS
Filed July 24, 1946 2 Sheets-Sheet 2
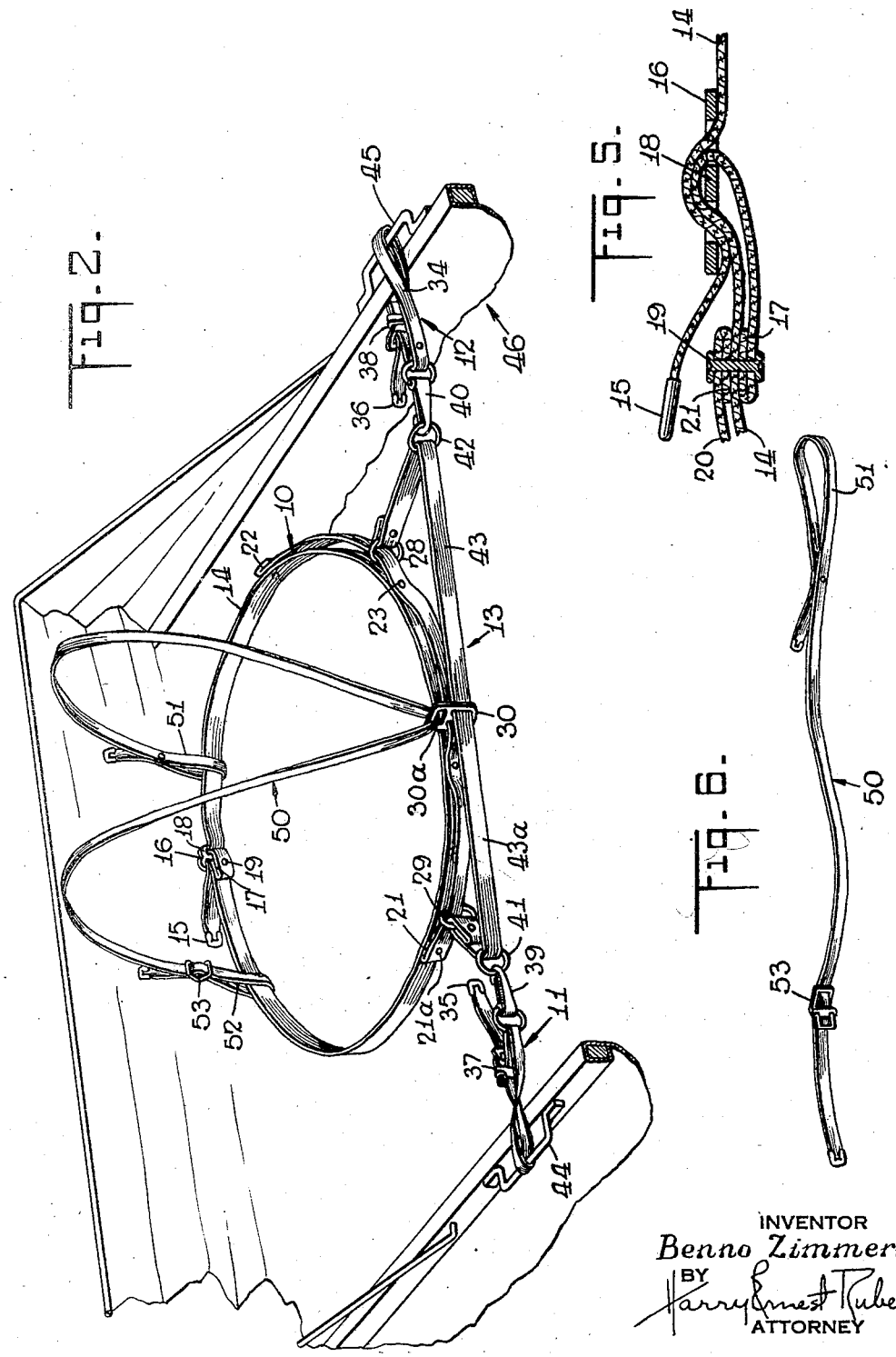
INVENTOR
Benno Zimmern
BY
Harry Ernest Rubens
ATTORNEY Patented Mar. 9, 1948

2,437,585

UNITED STATES PATENT OFFICE 2,437,585

CHILD'S SWIVEL HARNESS

Benno Zimmern, New York, N. Y.

Application July 24, 1946, Serial No. 686,023

2 Claims. (Cl. 227—49)

My invention relates to safety harness for retaining a child in a carriage or chair.

The principal object of my invention is to provide a harness for a child that will permit the child to rotate or move laterally within certain limits between fixed supports without tightening the belt around the child or causing any slack to appear in the harness.

Other objects are to provide a belt for a child, and retaining means therefor, which is self-adjustable with respect to said belt; to provide limiting means on said belt for limiting the amount of self-adjustment of the retaining means; to provide a suspender arrangement for said belt which is convertible into a leash for retaining the child while walking; to provide a harness which is readily removable from the carriage or chair; and to provide a belt harness for a child wherein the means for opening the belt is not accessible to the child.

I accomplish these and other objects and obtain my new results as will be apparent from the device described in the following specification, particularly pointed out in the claims, and illustrated in the accompanying drawing in which:

Fig. 1 is a perspective view of my child harness;

Fig. 2 is a similar view illustrating the harness secured to a carriage, and the position of the parts when the child has pulled to one side;

Fig. 3 is a similar view indicating the position of the parts when the child has pulled to the opposite direction.

Fig. 4 is a similar view of the harness with suspender arrangement opened to form a leash;

Fig. 5 is a sectional view of the belt buckle and adjacent parts;

Fig. 6 is a view of the opened suspender.

Referring more particularly to the drawings, reference numeral 10 designates a belt held in position by a pair of retaining elements 11 and 12 operating through the turning harness 13.

The belt 10 comprises the strap 14 provided with an end tab 15 for preventing the end of the strap from fraying, which belt encircles the child's waist, and terminates in the buckle 16, to which it is secured by looping the end 17 of the strap through the buckle bar 18, of the buckle, and riveting, as at 19, to the end portion of the strap.

The strap thus is fixedly secured to one end of the buckle, and after encircling the child's waist, is inserted into the buckle and detachably secured thereto.

The turning harness 13 includes a loop section 20, one end 21 of which is secured to rivet 21a with the remaining end 22 looped around the outside of belt 10 and riveted at 22a, the loop section having a length approximately one-half of the circumference of the belt 10.

Two intermediate rivets 23 and 24 divide the outside loop section 20 into three loop sections 25, 26 and 27. Within the end loop sections 25 and 27, single rings 28 and 29 are positioned, and in the middle loop section 26 a double ring 30 is positioned.

The end turning harness 13 is secured to single rings 28 and 29 by looping the ends of the strap therethrough, and riveting as at 31 and 32, passing the strap through the double ring 30.

Each of the retaining elements 11 and 12 are provided with straps 33 and 34, respectively, having end tabs 35 and 36, buckles 37 and 38, spring hooks 39 and 40 secured to rings 41 and 42, positioned in strap loops 43 and 44a formed by the rings 28, 29 and 30 secured to strap 20.

Straps 33 and 34 are looped through the carriage supports 44 and 45 for attaching the safety harness in position on the carriage 46 as shown in Fig. 2.

It will be apparent in the foregoing arrangement that I have provided a child's belt 10 which encircles a child's waist.

By employing a turning harness in connection with the belt, the child is able to rotate or turn without tightening or loosening about the child.

By my arrangement, the rings 28, 29 and 30 swing within their respective loops 25, 27 and 26, the turning harness taking up the slack on the side the child turns and supplying the added length to the opposite side of the child, through the ring 30.

In Fig. 2, the turning harness is shown in position upon the belt being moved to the left, while in Fig. 3 the turning harness has been adjusted by the movement of the belt to accommodate a movement to the right.

In Fig. 2, the harness is shown connected to a suspender top 50, having a closed loop 51 at one end thereof, and an open loop 52 at the remaining end employing the buckle 53.

In attaching the suspender to the belt, the belt buckle 16 is opened, and loop 51 placed over the belt. The suspender is then looped through ring 30 of the turning harness, which has a top slot 30a for this purpose. The loop 52 is thereafter positioned on the belt 14 and buckles 16 and 53 of the belt and suspender adjusted to the proper position.

The suspender may be used as a leash by unbuckling the loop 52 and removing the loop 51 from the belt, and the suspender 50 from the ring 30 through the unlooped end of the suspender. The looped end 51 becomes a hand engaging loop, and the buckled end of the suspender may be secured to any part of the belt or ring 30, as shown in Fig. 4.

In Fig. 5, the end 21 of loop section 20 is shown directly connected to the belt at rivet 19, instead of rivet 21a, thus eliminating a rivet operation.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

What is claimed is:

1. A child's harness comprising a belt for encircling a child's waist and provided with means for securing together the ends of the belt; a turning harness secured to said belt and retaining means for lateral securement of the turning harness to fixed points of support, said turning harness supporting the belt at not less than two spaced apart lateral points of support and provided with adjustable sliding means whereby the belt may be rotated while supported at the two spaced apart points of support without any slack appearing in the turning harness and retaining means.

2. The child's harness of claim 1, wherein the turning harness includes three loop sections formed on the outside of the belt, and a retaining strap section provided with five rings, the two outer rings each secured to an end loop and movable therein, the central ring secured to the intermediate loop, and the two intermediate rings secured to the retaining means for attachment to fixed points of support, said outer and intermediate rings movable with respect to their loop sections, and said intermediate and central rings movable with respect to the retaining strap section.

BENNO ZIMMERN.

REFERENCES CITED

The following references are of record in the file of this patent:

UNITED STATES PATENTS

| Number | Name | Date |
|---|---|---|
| 1,697,363 | Losey | Jan. 1, 1929 |
| 2,212,746 | Nunn | Aug. 27, 1940 |
| 2,308,466 | Johnson | Jan. 12, 1943 |